Oct. 14, 1941.   F. R. BICHOWSKY   2,258,730
REFRIGERATING APPARATUS
Original Filed March 4, 1930   3 Sheets-Sheet 1

INVENTOR
Francis R. Bichowsky
BY
Spencer, Hardman & Mehr
ATTORNEYS

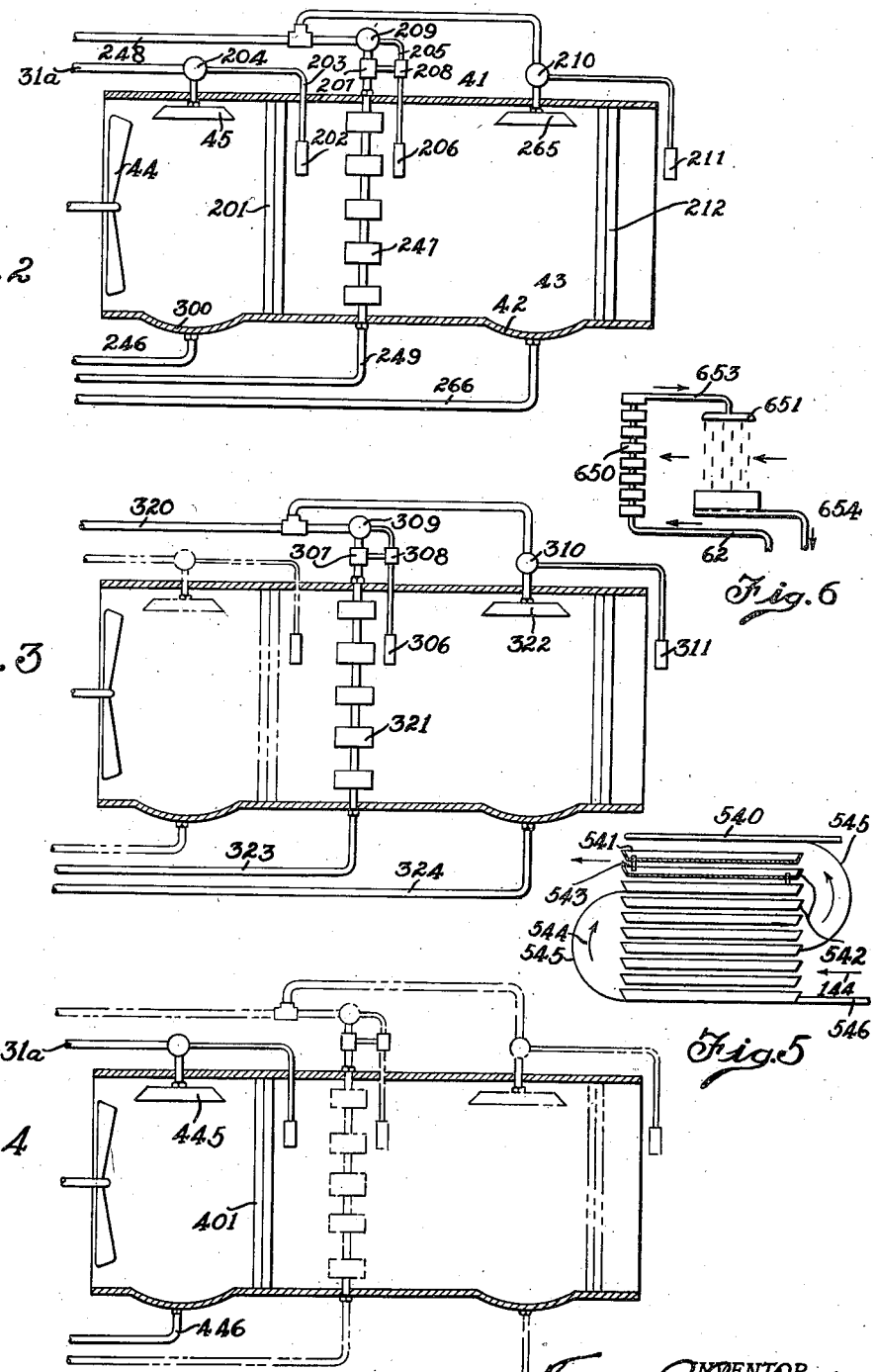

Patented Oct. 14, 1941

2,258,730

UNITED STATES PATENT OFFICE 2,258,730

REFRIGERATING APPARATUS

Francis Russell Bichowsky, Ann Arbor, Mich., assignor, by mesne assignments, to General Motors Corporation, a corporation of Delaware Application March 4, 1930, Serial No. 433,146
Renewed October 19, 1939

15 Claims. (Cl. 261—9)

This invention relates to refrigerating apparatus, and more particularly to a method of, and apparatus for, distributing conditioned air to one or more rooms of a dwelling, office building, apartment house or the like.

An object of this invention is to provide an apparatus for, and method of, distributing conditioned air, either heated or cooled above the normal or outside atmospheric air temperature.

Another object is to provide an apparatus, for, and method of, the character heretofore described, in which a central plant may be provided for furnishing the refrigeration, heat, moisture addition or removal necessary to condition the air to be distributed throughout the room, or rooms of the dwelling, office building, apartment house or the like.

Further objects and advantages of the present invention will be apparent from the following description, reference being had to the accompanying drawings, wherein a preferred form of the present invention is clearly shown.

In the drawings:

Fig. 2 is an enlarged vertical cross sectional view, somewhat diagrammtic, of a portion of the apparatus shown in Fig. 1;

Fig. 3 is a view similar to Fig. 2, but showing a modified form;

Fig. 4 is a view, similar to Fig. 2, but showing another modified form;

Fig. 5 is a vertical partly cross sectional and partly elevational view of a device for contacting conditioning medium with air;

Fig. 6 is a view similar to Fig. 5, but showing a modification thereof, and

Figure 1:
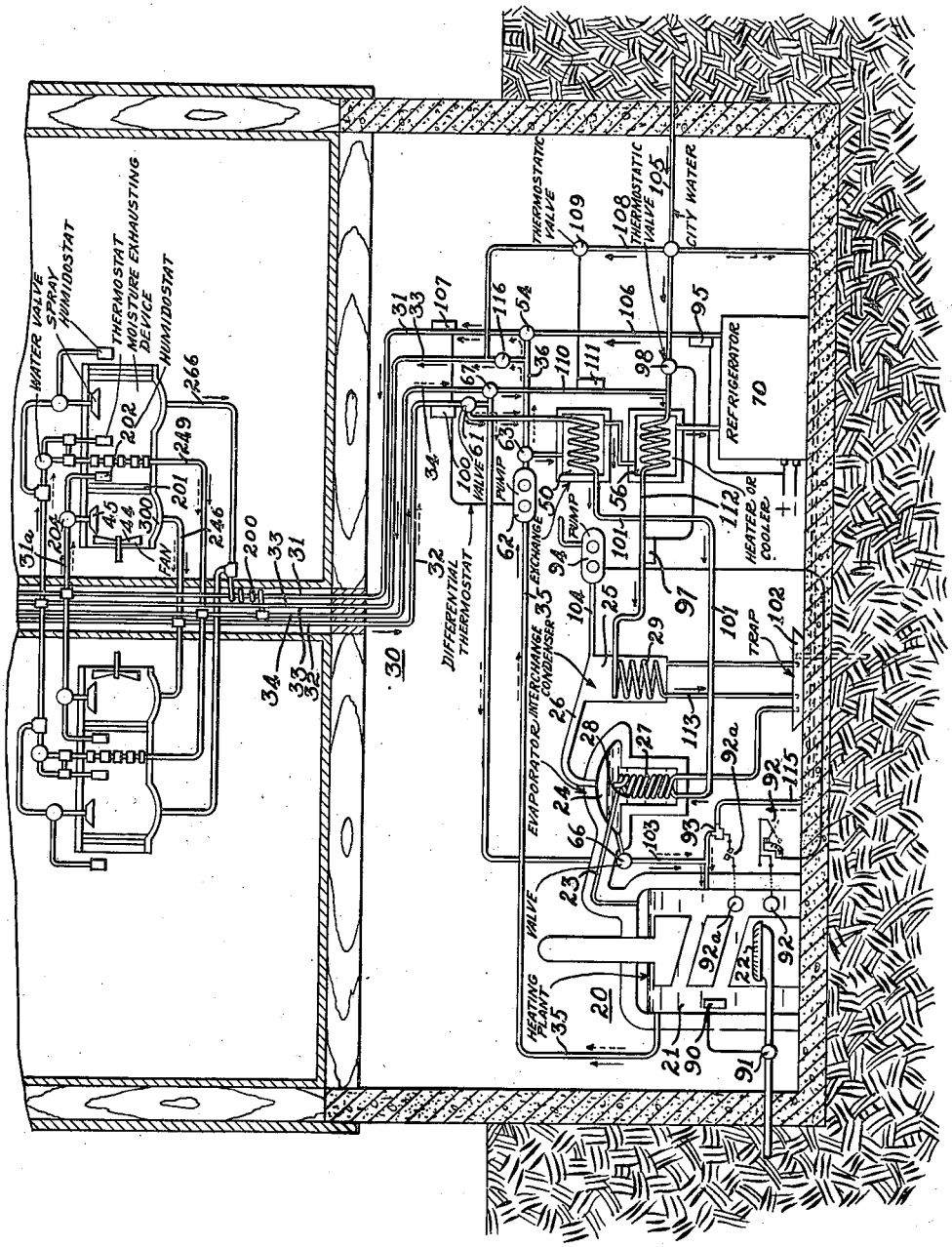
Fig. 1 is a view, somewhat diagrammatic, of an apparatus embodying features of this invention, showing such apparatus as applied to a building having several rooms to be provided with conditioned air.
Figure 7:
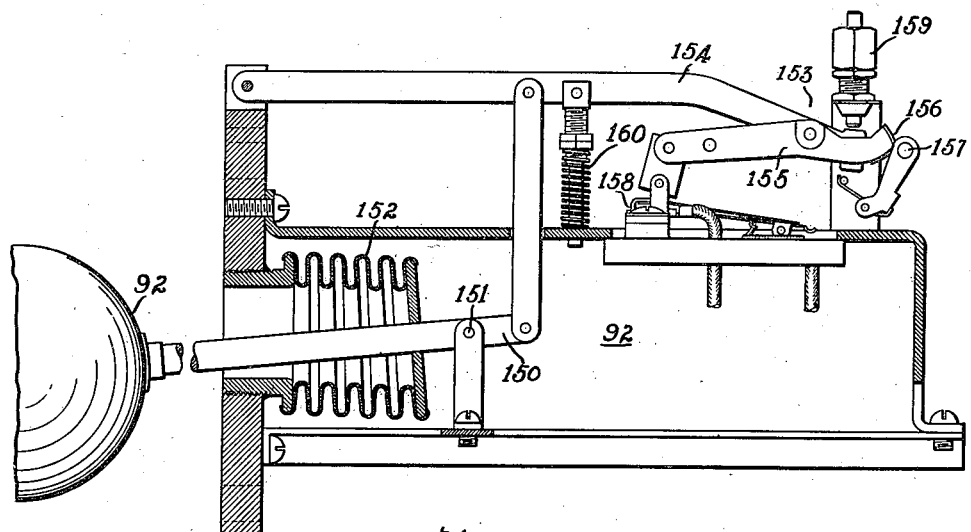
Figs. 7 and 8 are vertical cross sectional views somewhat diagrammatic, of a portion of Fig. 1.
Figure 8:
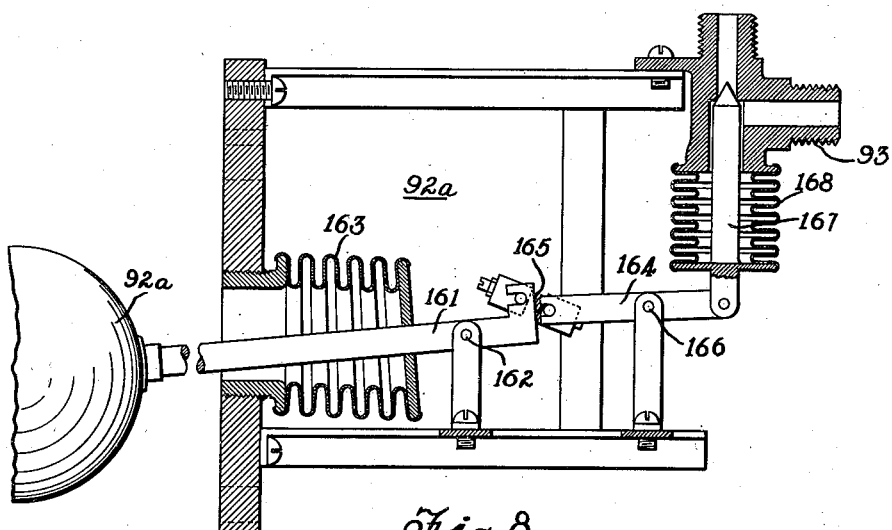

An apparatus embodying features of this invention may comprise, in general, a central heating plant 20, which may furnish the heating necessary to condition the air throughout a building, or it may be part of a refrigeration system which is adapted to furnish cooled conditioned air throughout the building. This central heat plant is adapted to contain a body of liquid 21 which may be circulated in a heated or subsequently cooled condition to the various rooms of the building, where such heated or cooled liquid is adapted to perform part or all of the heating, or cooling of the air to be distributed in the rooms. This central heating plant 20 is thus adapted to be used both under winter conditions or under summer conditions to either heat or cool the air to be distributed in the rooms of the building.

In addition, the liquid 21, which is circulated from the central heating plant 20, may be adapted to modify the relative humidity of the air to be distributed. This liquid may be used selectively either to add moisture or to remove moisture from the air to be conditioned. Ordinarily, in the winter time, where the air is to be heated above the normal or outside atmospheric temperature, the liquid 21 may be used to increase the relative humidity, while in the summer time, when the air is generally to be cooled below the normal or outside atmospheric temperature, the liquid 21 may be used to decrease the relative humidity of the air. This may be accomplished by choosing the liquid 21 from the class of liquids which when cooled to a certain temperature or concentrated to a certain specific gravity and when suitably contacted with air of a certain temperature and humidity will absorb moisture from the air, and which when heated to certain temperature and diluted with water to a certain specific gravity and suitably contacted with air of a certain humidity and temperature will give off water to said air. Such liquids will be characterized by having a partial pressure of water vapor, which depends on the concentration of the liquid and the temperature which are such that by not too great change of concentration and temperature, the partial pressure of water vapor of the liquid can be controlled so that the liquid is suitable for removing water from the air with which it is contacted, or for adding water to the air with which it is contacted, as may be desired.

Thus the following is for illustration. If the air to be conditioned has a temperature at the time of contacting with the liquid 21 of 100° F. and a relative humidity of 80%, as it might have in summer conditions, and it is desired to reduce its humidity to 50% at that temperature, the liquid used should be of such concentration and temperature at the time of contacting with the air that its partial pressure is less than the partial pressure of water in the air at 100° F. and 50% humidity. This may be calculated from hypsometric tables. As might be the case in winter, the air to be conditioned is at 60° F. and has a humidity of 10% and it is desired to raise its humidity so that when heated to 70° F. it has a humidity of 50%, the liquid used is the same as in the preceding illustration and may be diluted so that its partial pressure of water vapor at the temperature used is more than the partial pressure of water vapor in air at 70° F. and 50% humidity. Various liquids have such properties. Examples are concentrated water solutions of soluble salts such as $CaCl_2$, $NaCl$, $LiNO_3$, $Na_2SO_4$, solutions of certain acids such as $H_2SO_4$, molten salts such as $LiNO_5H_2O$, water soluble organic liquids such as glycerine, ethylene glycol, concentrated solutions of organic substances such as sugar, glucose. It is usually desired to use liquids that are not corrosive or toxic, that are not volatile and do not decompose, by heat, long standing or by contact with air.

The central heat plant 20 may be used as the place where moisture is added or removed from the system, and incidentally from the air to be conditioned, by evaporating under atmospheric pressure, or reduced pressure, the absorbed or gathered atmospheric moisture from the liquid 21. This evaporation may be in one, two or more stages. The auxiliary evaporator or evaporators 24 for these stages, may be separate structures as shown in the specific embodiment of Fig. 1 or they may be combined in one structure with the heating plant 20. The central heating plant or associated structures may be used to also add moisture to the system by providing a source of additional hot or cold water which may be mixed with liquid 21 diluting it so that when placed in contact with the air to be conditioned the liquid will lose part or all of said additional water to the air. All processes occurring in the central plant 20 and associated structures, especially the concentration, dilution and heating of liquid 21, may be controlled by automatic controls, designated in the specific embodiment shown in Fig. 1 as 90, 91, 92, 93, 94, etc.

Heat exchanging devices such as 50 may be provided to interchange heat between liquid 21 leaving the central plant and that returning to it, and auxiliary coolers or heaters such as 56 may be provided to further cool or heat the liquid. Means of refrigerating 70 may be provided as is desired. These devices may be automatically controlled for instance by controls 95, 97.

A piping system 30 may be used to interconnect the central plant 20 and the auxiliary heating and cooling devices and one or more contacting devices suitably placed throughout the building. Pump 62 or other means of circulation, may be provided to circulate fluid 21 through said piping 30 and auxiliary devices. Various automatic controls may be provided to control circulation of fluid 21 through the various pipes.

In Fig. 1 the position of the valves is shown for summer operation. In the embodiment there shown, the fluid 21 may return from the various rooms or other places where the air has been conditioned through the pipe 32, in a more or less cooled and diluted condition, passing the portion 100 of a differential thermostat which controls the operation of the pump 62. From thence the liquid is directed by the valve 61 to the heat exchanger 50 where it serves to partially cool the outgoing liquid 21. From the heat exchanger 50 the returning liquid 21 continues through pipe 101 to the concentrating plant and preferably first through the second stage evaporator 24 where the liquid enters through an interchanger 28 and is partially heated before being introduced into the upper part of the boiling chamber of the evaporator 24. Here it is boiled by live steam in the coil 27 which receives steam from the first stage in the central heating plant 20. The liquid 21 in the evaporator 24 boils and the steam passes out through pipe 26 into the condenser 25 where it is condensed by the liquid in pipe 29 and the condensate passes out through the waste trap 102. The concentrated liquid in the boiling chamber of the evaporator 24 is directed by valve 66 through the pipe 103 to the first stage 20 of the concentrating plant. Here the liquid 21 is further concentrated and passes out through the pipe 35. The concentration is accomplished by any suitable heating means, such as a gas burner 22, the intensity of the flame of which is controlled by the thermostatic bulb 90 acting on the valve control 91. This control automatically maintains the liquid in the chamber 21 at a constant desired temperature. The density or concentration of the liquid in the first stage 20 is automatically maintained by means of one or two density sensitive devices 92 and 92a. Device 92 operates to control the vacuum pump 94 in order to maintain a partial vacuum through the pipes 104, 26 and 103 in the first stage 20 and in any other stages of concentration. The degree of vacuum produced by the pump 94 controls the rate at which water is removed from the concentrating device and thus the concentration of the liquid is automatically maintained at any desired degree by means of the control 92. The concentrated liquid then continues through the pipe 35, pump 62 and is directed by valve 63 to the exchanger 50 from whence it continues to the intercooler 56. Here the amount of cooling is determined by the temperature of the water which affects the thermostatic bulb 97 controlling the valve 98 to determine the amount of water passing through the cooler 56 from the city supply 105. From the cooler 56 the concentrated liquid passes through refrigerator 70, if such refrigerator is deemed desirable, and continues through the line 106. The action of the refrigerator 70 may be automatically controlled by means of a thermostatic bulb 95 responsive to the temperature of the concentrated liquid leaving the refrigerator 70. The concentrated liquid in the line 106 is directed by the valve 54 past the element 107 of the differential thermostat which controls the action of the pump 62. From thence the concentrated liquid continues through the pipe 31 to the air conditioning device in the room or rooms where the air is to be conditioned.

If city water is used in the system, it may be introduced through the pipe 105 and a portion of this city water may be directed through the pipe 108, controlled by means of a valve 109, and may continue through the pipe 33 to the air conditioning device in the room or rooms. The water returning from these air conditioning devices may pass through the pipe 34 and may be directed by the valve 67 through the pipe 110 to the cooler 56. The water in the pipe 110 may pass a thermostatic bulb 111 which controls the action of the valve 109 in order to regulate the amount of water in response to the temperature of the water returning through the pipe 110. The return water 110 together with additional water from the pipe 105, may pass through the cooler 56 through the pipe 112 past the thermostatic bulb 97 and from thence through the coil 29, pipe 113 to the waste device 102.

The concentrated liquid may continue through the pipe 31 to the interchanger 200 which contains relatively cold water returning from the air conditioning device. The concentrated liquid may then continue through the pipe 31 and the branch 31a to the moisture exchanging device 45. This moisture exchanging device 45 may be a spray or the like and the amount of liquid may be controlled by means of a valve 204 actuated from a humidostat 202. The liquid, after having been in moisture exchanging relation with the air, may be gathered in the sump 300 and may return through the branch 246 to the return line 32 and from thence to the concentration plant in a manner elsewhere described. If desired, the air to be conditioned may be forced through the conditioning device by means of a fan 44 driven by an electric motor, water motor or the like, not shown. The air, after having contacted with the treating liquid in the exchanger 45, may pass through a spray eliminator 201 made, for instance, of zigzag vertical plates, which are well known in the art. The air may be further cooled by an exchanger 247 through which water from the city water supply pipe 105 may pass. The rate of flow of water may be controlled by means of a thermostatic bulb 206 which controls the action of a water valve 209 placed in the branch 248 and which controls the passage of water through the device 247. The water may then continue through the branch 249 and may enter the pipe 34 to the valve 67 where it continues in a manner elsewhere described. The air after passing through the exchanger 247, may, if desired, have its relative humidity increased and its temperature decreased by means of a moisture exchanging device 265. The amount of water passing through the device 265 may be controlled by means of a thermostat or humidostat 211 which controls the action of valve 210, which controls the amount of water pasing from the branch 248 to the device 265. An eliminator 212, similar to the eliminator 201 may be placed in order to remove unevaporated moisture from the air before the air is introduced into the room. The water from the device 265 with its temperature lowered, may pass through the branch 266 to the exchanger 200, as elsewhere described, and may continue to the line 34. The branch 248 may receive water from the pipe 33 which is connected to the city water supply 105.

For winter operation, the plant may be changed in order to accomplish the necessary air conditioning for winter operation. The liquid returning from the air conditioning device may be gathered in the pipe 34 from whence it is directed by the valve 67 to the first stage concentrator or plant 20. Additional water may be introduced into the first stage of the plant through the pipe 115 which is controlled by means of the valve 93. The valve 93 is actuated by the density responsive device 92a, which maintains the desired concentration of the liquid in the first stage heat of plant 20. The liquid in plant 20 is heated by means of gas burner 22 and its temperature is maintained at the desired point by the thermostat 90 actuating gas valve 91 in the gas line leading to the gas burner 22. The liquid, thus placed in the proper temperature and concentration conditions, then leaves through the pipe 35, passes through the pump 62, is directed by the valve 63 to the pipe 36. Here a portion of the liquid is directed by the valve 116 through the line 33, and another portion is directed by the valve 54 through the line 31. The liquid thus passes through the lines 31 and 33 to the air conditioning device or devices in the room or rooms and returns through the lines 32 and 34 from which it is directed by the valves 61 and 67 to the plant 20 as heretofore described. The differential thermostatic elements 100 and 107 control the operation of the pump 62 in the winter time as well as in the summer time. The liquid passing up through the line 31 is directed by the branch 31a to the moisture exchanging device 45 where the liquid humidifies and partially heats the air to be conditioned. The liquid is then gathered in the sump 300 and passes through the line 32 and returns to the plant 20 as heretofore described. The humidostat 202 controls the device 45 in the same manner as in the summer conditions. The liquid passing up through the line 33 passes through the branch 248 to the heat exchanging device 247 where it further heats the air. The liquid, after passing through the exchanger 247, passes through the branch 249 to the line 34 and returns to plant 20 as heretofore described. The thermostat 206 controls the amount of liquid passing through the device 247 in the manner heretofore described for summer conditions. The device 265 together with its controls 211 and 210 need not operate during winter conditions.

In the summer time, the air passing exchanger 45 has its relative humidity reduced by the absorbing power of the liquid 21. The absorbing process raises the temperature of the air, which temperature may be reduced by the exchanger 247, using either the liquid 21 or city water. Thereafter, if desired, the temperature of the air may be further reduced by humidifying the air with city water in the exchanger 265.

In Fig. 3 a modification is shown in which but a single liquid circuit is necessary. In this device the liquid may enter through the pipe 320 from the plant 20. This liquid may pass through a heat exchanger 321, similar to exchanger 247. Another portion of the liquid may pass through the liquid exchanger 322, similar to the exchanger 265. The portions of the liquid may be gathered by the pipes 323 and 324 and may be returned to the plant 20. In this modification, the air may be suitably heated or cooled by the exchanger 321, and the relative humidity may be modified by the exchanger 322. The relative positions of exchanger 321 and exchanger 322 may be reversed. By this device the temperature of the air may be either increased or decreased and the relative humidity may also be relatively increased or decreased. The controls 306, 307, 308, 309, 310 and 311 may be substantially the same as the correspondingly shown devices in Fig. 2.

In the modification shown in Fig. 4, the air may be conditioned merely by a liquid contact with the air. Thus the liquid from the plant 20 may enter from the branch 431a and may be contacted with the air by the liquid contact device 445, which may be a spraying device and may include the eliminators 401. Wet plates, over which the liquid flows, may be used instead. The liquid may be gathered in the branch 446 as heretofore described in relation to the similarly shown devices in Fig. 1. The necessary temperature and relative humidity may be imparted to the air by selecting the proper concentration of the solution used as liquid 21 so that the liquid may have the correct temperature and partial water vapor pressure in order to impart to the air the desired temperature and relative humidity. In Figs. 3 and 4 the dotted portions indicate the parts of the apparatus shown in Fig. 2 which may be omitted, or not used, under certain conditions, or during certain seasons.

In Fig. 5 is shown a combined heat and moisture exchanger which is adapted to impart the desired temperature and relative humidity to the air. This exchanger may include a liquid spray pipe 540 which drains into an upper pan 541. A vertical row of pans 542 may receive liquid from the pans immediately above the same, for instance, by providing pipes 543 placed with their upper ends a slight distance above the bottoms of the pans. This maintains a body of liquid within each of the pans. The air is contacted with the liquid of the lower pans as indicated by the arrows 544, which air is guided by casings 545. The air entering the conditioner has at first the temperature imparted to it by the outgoing liquid. Since this liquid has already absorbed moisture from the air, the first contact of the air and liquid is more of thermal contact, while the last stages of the contact as performed by the three upper pans is more of a moisture exchanging contact. The upper pan 541 may receive the liquid 21 from the central plant to which the liquid may be returned from the lower pan, for instance by pipe 546. The connection with the central plant may be the same as in Fig. 1 in so far as it is consistent.

In the modification shown in Fig. 6 the same result may be obtained by providing the heat exchanger 650 and the liquid exchanger 651. It is thus seen that the air first contacts with the liquid and lastly with the exchanger 650 where only heat exchange may be produced. The direction of the flow of air may be reversed. The liquid may be delivered from the plant 20 through the pipe 62 to the exchanger 650. The liquid may then pass through the pipe 653 to the exchanger 651. The liquid returns to the plant 20 through the pipe 654.

The controls for governing the concentration of the liquid in plant 20 may be governed by one or two floats. Preferably two floats 92 and 92a may be provided inside of the central plant 20. The float 92 is adapted to control the starting and stopping of the motor which drives the pump 94 while the float 92a is adapted to control the valve 93 which admits water into the plant 20.

The float 92 may be carried by an arm 150 pivoted at 151 and secured to the casing of the plant 20 through the medium of a Sylphon 152 which permits a rocking movement of the arm 150. The arm 150 operates a snap switch 153 which starts and stops the motor driving the pump 94. Any suitable type of snap switch may be used. Thus the arm 150 operates the arm 154 to which is pivoted another arm structure 155 which latter arm structure is provided with a cam surface 156 on which a resiliently urged roller 157 rides and provides the snap action for opening and closing the contact points 158. Suitable adjustments 159 and 160 may be provided for adjusting the pressures necessary for the float to overcome in order to operate the switch. Thus it will be seen that when the liquid in the plant 20 reaches a predetermined low specific gravity, the motor is started by the sinking of the float. This immediately starts an enhanced evaporating action in the plant 20 until such a time as the specific gravity of the liquid rises and causes the float to rise and stop the motor. By this action a substantially constant degree of concentration of the liquid in the plant 20 is maintained between predetermined operating limits.

When it is necessary to add water to the liquid in the plant 20, in order to humidify the air in the building, the valve 93 is opened. This is accomplished automatically by means of the float 92a. Thus the float 92a operates an arm 161 fulcrumed at 162 and provided with a Sylphon 163 which is secured to the casing of the plant 20. The arm 161 operates another arm 164 through the medium of the snap acting mechanism 165. The arm 164 is fulcrumed at 166 and operates the valve stem 167. A suitable seal, such as a Sylphon 168 is secured to the valve stem 167 and to the valve casing in order to prevent the waste of water at this point. Thus it is seen that when the specific gravity of the liquid in the plant 20 rises the float 92a rises and opens the valve 93 thus introducing water into the plant 20 until such a time as the specific gravity of the liquid causes float 92a to sink. When the float 92a has sunk a predetermined distance the valve 93 is closed. Thus it is seen that the float 92a maintains the liquid in the plant 20 at a substantially constant degree of concentration within predetermined limits.

In the summer time, when moisture is being removed from the air, generally the float 92 is the predominating control and operates the pump 94 in order to maintain the liquid at the degree of concentration necessary to absorb moisture from the air. By maintaining the liquid at a proper degree of concentration and a proper temperature, a certain water vapor pressure is produced in the liquid so that the predetermined degree of relative humidity is maintained in the conditioned air.

On the other hand, in the winter time, the float 92a becomes the predominating control since at this time moisture is generally added to the air. By maintaining the liquid at a predetermined temperature and degree of concentration it is possible to provide conditioned air of a predetermined temperature and degree of saturation.

The plant 20 need not be provided with the stage evaporator 24. The condenser 25 may be connected to the boiler 20 without the use of the evaporator 24. In such a case, the entire concentration would be performed in the boiler 20. The controls for the pump 62, valve 93 and burner 22 preferably are retained when the evaporator 24 is omitted.

While the form of embodiment of the invention as herein disclosed, constitutes a preferred form, it is to be understood that other forms might be adopted, all coming within the scope of the claims which follow.

What is claimed is as follows:

1. An apparatus for conditioning air in a plurality of rooms of a building, which apparatus comprises a central plant for maintaining a main body of liquid at the proper temperature and partial water vapor pressure, means for circulating streams of said liquid between the various rooms and the said main body of liquid, means for contacting said streams of liquid with the air in said rooms, means for automatically controlling the flow of liquid in said means for contacting in accordance with the temperature and humidity of the contacted air.

2. An apparatus for conditioning air which comprises means for contacting an aqueous solution with the air to be conditioned and means for maintaining said solution at a predetermined temperature and degree of water vapor tension including a boiler, means for heating said boiler, a thermostat for controlling said means for heating, and means for maintaining the solution in said boiler at a predetermined pressure other than atmospheric.

3. An apparatus for conditioning air which comprises means for contacting an aqueous solution with the air to be conditioned and means for maintaining said solution at a predetermined temperature and degree of water vapor tension including a boiler, means for heating said boiler, a thermostat for controlling said means for heating, means for maintaining the solution in said boiler at a predetermined pressure other than atmospheric, and means for adding water to the solution in said boiler in accordance with the concentration of said liquid.

4. A method of conditioning gas which includes the steps of contacting said gas with a circulated hygroscopic liquid cooled to such an extent that said gas is dehydrated without substantial change of dry bulb temperature, and contacting said gas with a spray of water whereby said temperature of the gas is lowered by evaporation of some of said water and its humidity raised to the desired degree.

5. An apparatus for conditioning gas which comprises means for contacting an aqueous solution with the gas to be conditioned and means for maintaining said solution at a predetermined temperature and degree of water vapor tension including means for heating said solution, a thermostat for controlling said means for heating, and means for maintaining the solution being heated at a pressure other than atmospheric.

6. An apparatus for conditioning gas which comprises means for contacting an aqueous solution with the gas to be conditioned and means for maintaining said solution at a predetermined temperature and degree of water vapor tension including means for heating said solution, a thermostat for controlling said means for heating, means for maintaining the solution being heated at a pressure other than atmospheric, and means for adding water to the solution in accordance with the concentration of said liquid.

7. An apparatus for conditioning gas, which apparatus comprises a central plant for maintaining a main body of liquid at the proper temperature and partial water vapor pressure, means for circulating streams of said liquid between the gas to be conditioned and the said main body of liquid, means for contacting said streams of liquid with the gas, and means for automatically controlling the flow of liquid in said means for contacting said gas in accordance with the temperature and humidity of the contacted gas.

8. An apparatus for conditioning gas, which apparatus comprises a central plant for maintaining a main body of liquid at the proper temperature and partial water vapor pressure, means for circulating streams of said liquid between the gas to be conditioned and the said main body of liquid, means for contacting said streams of liquid with the gas, and means responsive to at least one function of the psychrometric condition of said gas for automatically controlling the flow of liquid in said means for contacting said gas.

9. In a gas drying system, means for contacting said gas with a hygroscopic medium, means for concentrating said hygroscopic medium, means for circulating a cooling liquid in thermal exchange with said gas, and means for thereafter flowing said cooling liquid in thermal exchange with said concentrated hygroscopic medium so as to cool said medium.

10. In a gas drying system, means for contacting said gas with a hygroscopic solution, means for reconditioning said solution after contact with said gas comprising means for heating said medium, thermal means controlling the amount of heat supplied to said medium, and means for varying the pressure on said medium during the reconditioning thereof.

11. In a drying system, a gas contacting unit, a hygroscopic concentrating unit, means for circulating a hygroscopic medium between said contacting unit and said concentrating unit, means for maintaining the hygroscopic medium in said concentrating unit at a constant temperature, and means responsive to the temperature of the hygroscopic medium returning from said gas contacting unit controlling the flow of said medium between said units.

12. In a gas conditioning unit, means for contacting said gas with a hygroscopic medium, means for regenerating said hygroscopic medium after contact with said gas comprising a first stage evaporator, means for supplying heat to said medium in said first stage evaporator, a second stage evaporator, means for supplying heat to said medium in said second stage evaporator, means for creating a partial vacuum in said second stage evaporator, and means responsive to the density in one of said evaporators for controlling said means for maintaining a partial vacuum.

13. In a gas conditioning system, means for flowing said gas in contact with a hygroscopic medium, an attemperating unit in thermal exchange relationship with said gas, means for circulating a cooling liquid through said unit when cooling of said gas is desired, means for reconditioning said hygroscopic medium including means for heating said medium, and means for circulating heated hygroscopic medium through said unit when heating is required.

14. In an apparatus for conditioning gas, a gas conditioning chamber, means in said chamber for contacting said gas with a hygroscopic fluid, means in said chamber for circulating a cooling fluid in thermal exchange relationship with said gas, means for regenerating said hygroscopic fluid comprising means for heating said hygroscopic fluid so as to vaporize a portion thereof, and means for flowing said vapor in thermal exchange relationship with fluid returning from said gas conditioning chamber.

15. In combination, means for contacting a gas to be conditioned with a hygroscopic liquid, means for cooling said gas by thermal exchange with a cooling liquid, and means for reconditioning one portion of said liquid for reuse comprising means for subjecting said liquid to a subatmospheric pressure at a temperature at which evaporation readily takes place.

FRANCIS RUSSELL BICHOWSKY.